Nov. 16, 1948.    L. R. HEIM    2,454,252
LUBRICATOR HEAD CONSTRUCTION
Filed Feb. 24, 1945
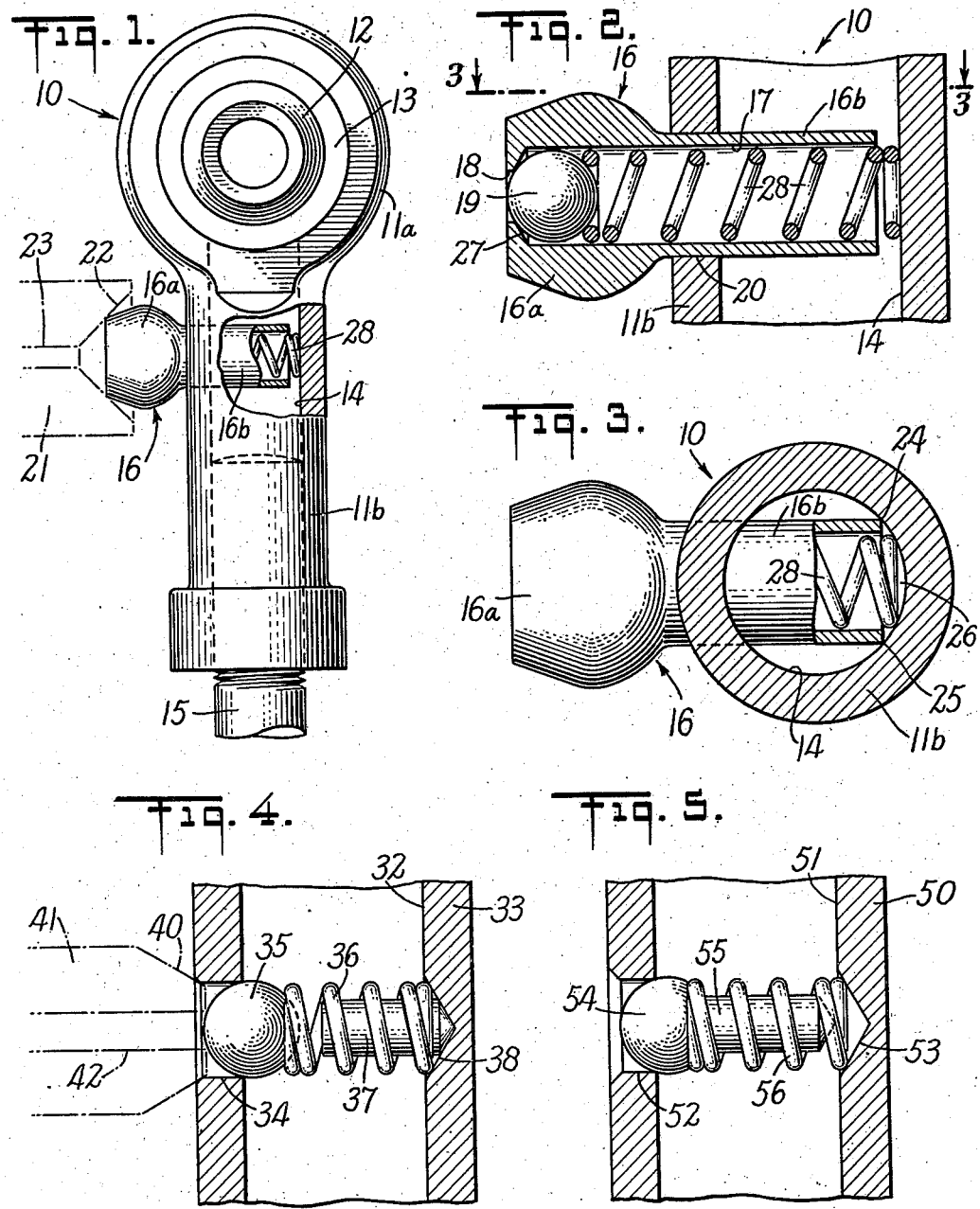
INVENTOR
Lewis R. Heim
BY
Blair, Curtis + Hayward
ATTORNEYS Patented Nov. 16, 1948

2,454,252

UNITED STATES PATENT OFFICE 2,454,252

LUBRICATOR HEAD CONSTRUCTION

Lewis R. Heim, Fairfield, Conn., assignor to The Heim Company, Fairfield, Conn.

Application February 24, 1945, Serial No. 579,619

3 Claims. (Cl. 184—105)

This invention relates to lubrication and more specifically to lubricator head construction.

One of the objects of this invention is to provide a lubricator head which is simple, practical, and thoroughly durable. Another object is to provide a construction of the above character which will be strong and well able to withstand the strains of hard usage. Another object is to provide a construction of the above character, the manufacture of which will be economical both from the standpoint of labor and materials used. Another object is to provide a construction of the above character which has a minimum of individual parts, thus facilitating its assembly. A further object is to provide a construction of the above character through the use of which an article may be lubricated in a minimum of time with a maximum of ease. Other objects will be in part obvious and in part pointed out hereinafter.

The invention accordingly consists in the features of construction, combinations of elements, and arrangements of parts, all as will be illustratively described herein, and the scope of the application which will be indicated in the following claims.

In the accompanying drawings, in which are shown several of the various possible embodiments of this invention, Figure 1 is a side elevation of a bearing having a lubricator head mounted thereon;

Figure 2 is a vertical section on an enlarged scale of a portion of the bearing construction shown in Figure 1, showing the lubricator head in section;

Figure 3 is a horizontal section taken on the line 3—3 of Figure 2, certain parts being broken away for purposes of clarification;

Figure 4 is a vertical section similar to Figure 2, showing a modified form of the construction shown in Figure 2; and Figure 5 is a vertical section similar to Figure 2, showing still another modified form of the construction shown in Figure 2.

Similar reference characters refer to similar parts throughout the several views of the drawings.

Referring now to Figure 1, a rod end bearing, generally indicated at 10, is shown. The upper end 11a of rod end bearing 10, as viewed in Figure 1, has a ball bearing 12 mounted therein by a pair of bushings, similar to bushing 13. The shank portion 11b of the bearing 10 has a bore 14 extending therethrough. This bore connects with a lubricating groove between bushings 13 and is usually internally threaded at its lower end to receive the end of a rod 15. Bore 14 is filled with grease or other lubricant through a lubricator head, generally indicated at 16, and when filled forms a reservoir for supplying lubricant to bearing 12.

Lubricator head 16 (Figure 2) has a lubricating bore 17 extending thereinto from its right-hand end, as viewed in Figure 2. A hole 18 of considerably smaller diameter than bore 17 opens into bore 17 at its left-hand end providing a valve seat 27 for a check ball 19, which is of a smaller diameter than bore 17. The head portion 16a of lubricator head 16 (Figure 2) is enlarged and its outer portion is beveled toward the axis of head 16. This forms a seat for the mouth 22 of the nozzle 21 (Figure 1) of a unit for injecting grease or other lubricant under pressure through the lubricator head into bore 14. The shape of mouth 22 is complementary to the bevel of the outer portion of head portion 16a and thus a tight connection is formed when the nozzle of the lubricating unit is mounted on the lubricating head. The lubricant under pressure is supplied to mouth 22 of nozzle 21 through bore 23.

The shank portion 16b (Figure 2) of lubricator head 16 is cylindrically shaped and fits with a force fit in a hole 20 in the shank 11b of bearing 10. When lubricator head 16 is being mounted in hole 20, it is driven in until its inner end (Figure 3) strikes the opposite side of bore 17. Because of the curvature of the wall of bore 17 and because the inner end of portion 16b is cut off in a radial plane, the right-hand end of head 16 strikes the side wall at points 24 and 25. This provides spaces, such as space 26, at both sides of the inner end of the lubricator head through which the lubricant passing through hole 18 and bore 17 passes into bore 14 (Figure 1). Ball 19 is yieldingly held against valve seat 27 by a coil spring 28 which is inserted in bore 17 prior to the mounting of head 16 on bearing 10. Spring 28 is of sufficient length so that when head 16 is mounted on bearing 10 it is slightly compressed between the side wall of bore 17 and ball 19.

Thus it will be seen that lubricator head 16 may be mounted on bearing 10 with a maximum of ease and that passageways connecting bores 14 and 17 are automatically provided. Spring 28 holds ball 19 seated against seat 27 thus preventing leakage of the lubricant from bore 17 and thus from bore 14. When the nozzle of the lubricant-injecting unit is seated on the outer portion of head 16, a tight connection is made so that the lubricant passing through bore 23 passes through hole 18 forcing ball 19 to the left, as viewed in Figure 2. This permits the lubricant to flow past ball 19, through bore 17 (Figure 3) and into bore 14 to fill the lubricant reservoir.

Referring now to Figure 4, in which a modified type of construction is shown, bore 32 is similar to bore 14 (Figure 1) and bearing shank 33 is similar to the shank 11b (Figure 2) of bearing 10. Shank 33 has a lubricating hole 34 extending therethrough, the axis of which is radially aligned with respect to the axis of bore 32. The inner end of hole 34 is yieldingly closed by a ball 35. This ball is resiliently held in sealing relationship with respect to hole 34 by means of a coil spring 36 which acts between the left-hand side wall of housing 33, as viewed in Figure 4, and ball 35. To limit inward movement of ball 35, a pin 37 is provided. This pin is positioned within coil spring 36 and the right-hand ends of both pin 37 and spring 36, as viewed in Figure 4, are seated in a conically shaped recess 38 in shank 33 diametrically positioned across bore 32 from hole 34. The right-hand end of pin 37 is conically shaped and it coacts with recess 38 to aid in diametrically aligning the axis of pin 37 and spring 36 with respect to bore 32.

In assembling this unit, ball 35, which is of slightly greater diameter than hole 34, is forced through hole 34. This prevents spring 36 from forcing ball 35 out through hole 34 and also insures the formation of a tight seal between ball 35 and the inner end of hole 34 whenever ball 35 engages hole 34. The left-hand edge of hole 34, as viewed in Figure 4, is beveled to form a seat for the beveled edge 40 of the nozzle 41 of a pressure lubricating unit. When a lubricant is being injected into the bearing, lubricant under pressure passing through the hole 42 in the nozzle 41 of the lubricating unit acts upon ball 35 to move it to the right against the action of coil spring 36 until it strikes pin 37. At this time the lubricant passes around ball 35 into the space provided by bore 32 and thus lubricates the bearing. When pressure on ball 35 is released, spring 36 moves ball 35 back into a seated position in hole 34 thus preventing any lubricant from escaping from bore 32.

Referring now to Figure 5, in which another modified form of construction is shown, bearing shank 50 is similar to the shank 11b of bearing 10 (Figure 2) and has a bore 51 similar to bore 17 extending therethrough. Shank 50 has a lubricating hole 52 extending therethrough, the axis of which is radially aligned with respect to the axis of bore 51 and diametrically across bore 51 from hole 52 is a conically shaped recess 53. A pin 55 has a head 54 which is yieldingly held in engagement with the inner end of lubricating hole 52 by a coil spring 56. This spring, which is mounted on pin 55, acts between head 54 and the side wall of bore 51. The right-hand end of spring 56, as viewed in Figure 5, is seated in recess 53. Head 54 is of slightly greater diameter than the diameter of hole 52 and in assembly head 54 is passed through hole 52 by a punch. After it has been inserted, the inner edge of hole 52 forms a seat for head 54 because of the expansion of head 54 and contraction of the wall of the rod end.

In use when the tip of the nozzle (not shown) of the lubricating unit is inserted into the outer end of lubricating hole 52, the lubricant under pressure forces head 54 inwardly until the end of pin 55 is seated in recess 53. Thus pin 55 limits inward movement of head 54 and maintains the parts in assembled relationship. At this time the lubricant can freely pass head 54 and flows into bore 51, thus lubricating the bearing and filling the reservoir formed by bore 51. Whenever the pressure of the lubricant is withdrawn, the spring 56 presses head 54 outwardly to seat head 54 in the inner end of hole 52 and thus prevent any lubricant from escaping from bore 51.

Through the use of the lubricating heads described hereinabove, the bearing 10 may be lubricated with a maximum of ease in a minimum of time. Furthermore, the heads described hereinabove are so constructed that they may be readily mounted upon and used in connection with a large variety of different types of bearings. Thus efficient and practical constructions have been disclosed in which the several hereinabove objects, as well as many others, are successfully accomplished.

As many possible embodiments may be made of the mechanical features of the above invention, and as many changes might be made in the embodiment above set forth, all without departing from the scope of the invention, it is to be understood that all matter hereinbefore set forth, or shown in the accompanying drawings, is to be interpreted illustratively and not in a limiting sense.

I claim:

1. In bearing construction, in combination, a member having a bore extending therethrough and having a hole extending through its wall into said bore, the axis of said hole being at right angles to the axis of said bore, a second member having a cylindrically shaped inner portion securely mounted in said hole and extending across said bore to abut against the opposite side thereof, the inner end of said second member being cut off in a radial plane, whereby space is provided between the inner end of said second member and the curved side wall of said bore when said second member is mounted on said first-mentioned member, said second member having a lubricating hole extending therethrough and having a head shaped to fit the mouth of a nozzle of a lubricant-injecting unit, and check valve means in said second member to prevent lubricant from flowing from said space outwardly from said bore through said lubricating hole.

2. In bearing construction, in combination, a member having a bore extending therethrough and having a hole extending through its wall into said bore, the axis of said hole being at right angles to the axis of said bore, a second member having a cylindrically shaped inner portion securely mounted in said hole and extending across said bore to abut against the opposite side thereof, the inner end of said second member being cut off in a radial plane, whereby space is provided between the inner end of said second member and the curved side wall of said bore when said second member is mounted on said first-mentioned member, said second member having a lubricating hole extending therethrough and having a head shaped to fit the mouth of a nozzle of a lubricant-injecting unit, said lubricating hole having a portion of reduced diameter adjacent the outer end thereof to provide a valve seat, a check ball mounted in said last-mentioned hole, and spring means for holding said ball against said valve seat, said spring means acting between said check ball and the wall of said bore against which the inner end of said second member abuts.

3. In bearing construction, in combination, a member having a bore extending therethrough and having a hole extending through its wall opening into said bore, the axis of said hole being substantially at right angles to the axis of said bore, and a second member mounted in said hole and having a cylindrically shaped inner portion extending across said bore to abut against the opposite side thereof, the inner end of said second member being cut off in a radial plane, whereby space is provided between the inner end of said second member and the curved side wall of said bore when said second member is mounted on said first-mentioned member, said second member having a lubricating hole extending therethrough and having a head shaped to fit the nozzle of a lubricant-injecting unit.

LEWIS R. HEIM.

REFERENCES CITED

The following references are of record in the file of this patent:

UNITED STATES PATENTS

| Number | Name | Date |
|---|---|---|
| 810,994 | Stuart | Jan. 30, 1906 |
| 998,582 | Lucas | July 18, 1911 |
| 1,366,065 | Davis | Jan. 18, 1921 |
| 1,551,654 | Garman | Sept. 1, 1925 |
| 1,655,213 | Zerk | Jan. 3, 1928 |
| 1,673,459 | Jurad | June 12, 1928 |
| 1,933,761 | Ross | Nov. 7, 1933 |
| 2,005,028 | Eynon | June 18, 1935 |
| 2,053,864 | Cook | Sept. 8, 1936 |
| 2,151,171 | Thomas | Mar. 21, 1939 |

FOREIGN PATENTS

| Number | Country | Date |
|---|---|---|
| 23,189 | France | May 14, 1921 |